(12) United States Patent
Dondurur et al.

(10) Patent No.: US 8,700,983 B2
(45) Date of Patent: Apr. 15, 2014

(54) METHOD OF GENERATING A GRAPHICAL RESUME

(75) Inventors: Mehmet Dondurur, Dhahran (SA); Ahmet Z. Sahin, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 431 days.

(21) Appl. No.: 12/897,701

(22) Filed: Oct. 4, 2010

(65) Prior Publication Data
US 2012/0084633 A1 Apr. 5, 2012

(51) Int. Cl.
*G06F 17/00* (2006.01)

(52) U.S. Cl.
USPC ........................................................ 715/226

(58) Field of Classification Search
USPC ........................................................ 715/226
See application file for complete search history.

(56) References Cited

U.S. PATENT DOCUMENTS

| | | | |
|---|---|---|---|
| 5,832,497 A | 11/1998 | Taylor | |
| 6,370,510 B1 | 4/2002 | McGovern et al. | |
| 7,496,518 B1 | 2/2009 | Cayton et al. | |
| 2002/0032576 A1* | 3/2002 | Abbott et al. | 705/1 |
| 2002/0065852 A1* | 5/2002 | Hendrickson et al. | 707/517 |
| 2002/0169631 A1 | 11/2002 | Lewis | |
| 2003/0177027 A1 | 9/2003 | DiMarco | |
| 2003/0220811 A1 | 11/2003 | Fan et al. | |
| 2005/0137896 A1 | 6/2005 | Pentecost et al. | |
| 2005/0273348 A1 | 12/2005 | Brooks | |
| 2007/0185723 A1 | 8/2007 | Shellnutt | |
| 2007/0265865 A1 | 11/2007 | Cox et al. | |
| 2007/0294092 A1 | 12/2007 | Calannio | |
| 2010/0100408 A1 | 4/2010 | Dion | |
| 2010/0125475 A1 | 5/2010 | Twyman | |

FOREIGN PATENT DOCUMENTS

WO    WO2007133464 A3    11/2007

* cited by examiner

*Primary Examiner* — Doug Hutton, Jr.
*Assistant Examiner* — Andrew McIntosh
(74) *Attorney, Agent, or Firm* — Richard C Litman

(57) ABSTRACT

The method of generating a graphical resume allows a user to produce either a conventional textual resume or a resume in a graphical format. A database is established and a plurality of templates are stored in the database. The templates include an informational template, a textual resume template and a plurality of graphical resume templates. Each of the templates includes at least one fillable resume field. The informational template is displayed to the user and bibliographic data entered by the user is stored in the database. A plurality of resume formats are then displayed. The plurality of resume formats correspond to the textual and the graphical resume templates. Upon selection of one of the resume formats, the at least one fillable resume field of the corresponding one of the textual and the graphical resume templates is filled with the bibliographic data stored in the database to produce a resume.

17 Claims, 13 Drawing Sheets

1. Insert or Type Your Contact (Name And Address, email and Phone, Clearances) — 32
2. Insert or Type or *import* Your Objectives (Briefly describe or insert as bullet) — 34
3. Insert or Type or *import* Your Skills Summary (Summarize core skills as bullet) — 36
4. Insert or Type or *import* Your Education (Degree Title, Institution/Univ and Date Granted) — 38
5. Insert or Type or *import* Your Certificates (Degree Title, Institution/Univ and Expiration Date) — 40
6. Insert or Type or *import* Your Training (Course Name, Institution/Univ and Expiration Date) — 42
7. Insert or Type or *import* Your Employment History (Job Title, Company, Date and Brief Description) — 44

*Fig. 2*

METHOD OF GENERATING A GRAPHICAL RESUME

BACKGROUND OF THE INVENTION

1. Field of the Invention

The present invention relates to a method of producing customized electronic documents, and particularly to a computerized method of generating a graphical resume with customizable features.

2. Description of the Related Art

A resume is a document that contains a summary of relevant job experience and education for specific employment search. The resume is typically the first item that a potential employer encounters regarding the job seeker and is typically used to screen applicants, often followed by an interview, when seeking employment. A typical resume does not allow a potential employer to quickly assess the skills of a particular job applicant in a short time. Rather, the potential employer must read the entire text of the resume and follow up with additional questions during the interview and further screening.

Although resumes may be provided to potential employers, allowing the employer to use a standard text search to find information, such a process is not only inefficient, but may be inaccurate, based upon word choice and syntax of the user. In order to allow a potential employer to more easily assess a user's skills and background in a time efficient manner, it would be desirable to provide a method for easily visualizing a candidate's skills and experience. Thus, a method of generating a graphical resume solving the aforementioned problems is desired.

SUMMARY OF THE INVENTION

The method of generating a graphical resume allows a user to easily produce either a conventional textual resume or a resume in a graphical format. The method of generating a graphical resume is implemented on a computer or a computer terminal that is part of a computer network. The method of generating a graphical resume may be provided to the user as a software application on a stand-alone computer, computer terminal, portable computing device or the like, or as a web page or portable application on a networked computer, computer terminal or portable device.

A database is initially established and stored in computer readable memory associated with the user's computer or with a server in the computer network. A plurality of templates are stored in the database. The templates include an informational template, a textual resume template, and a plurality of graphical resume templates. The textual resume template and the plurality of graphical resume templates each include at least one fillable resume field.

Upon launch of the software application or web page, the informational template is displayed to the user. The informational template includes at least one fillable bibliographic field for receiving bibliographic data from the user. The bibliographic data entered by the user is stored in the database.

A plurality of resume formats are then displayed to the user. The plurality of resume formats correspond to the textual resume template and the plurality of graphical resume templates stored in the database. Upon user selection of one of the plurality of resume formats, the at least one fillable resume field of the corresponding one of the textual resume template and the plurality of graphical resume templates stored in the database is filled with the bibliographic data stored in the database to produce a resume.

The resume is stored in the database as an electronic document and is displayed to the user. The electronic document may then be printed or transmitted over the computer network. In an alternative embodiment, the user may select a manual mode of operation. Rather than filling the textual templates and having the selected graphical style of resume automatically filled with the information, the user may first choose a blank or empty graphical resume and then manually enter the user's data directly into the selected graphical form.

These and other features of the present invention will become readily apparent upon further review of the following specification.

BRIEF DESCRIPTION OF THE DRAWINGS

FIG. 2 is an exemplary screenshot of a template for entering user information in a method of generating a graphical resume according to the present invention.

Similar reference characters denote corresponding features consistently throughout the attached drawings.

DETAILED DESCRIPTION OF THE PREFERRED EMBODIMENTS

The method of generating a graphical resume allows a user to produce either a conventional textual resume or a resume in a graphical format. The method of generating a graphical resume is implemented on a computer, or on a computer terminal that is part of a computer network. It should be understood that the method of generating a graphical resume may be provided to the user as a software application on a stand-alone computer, a computer terminal, portable a computing device or the like, or as a web page or portable application on a networked computer, computer terminal or portable device.

Figure 13:
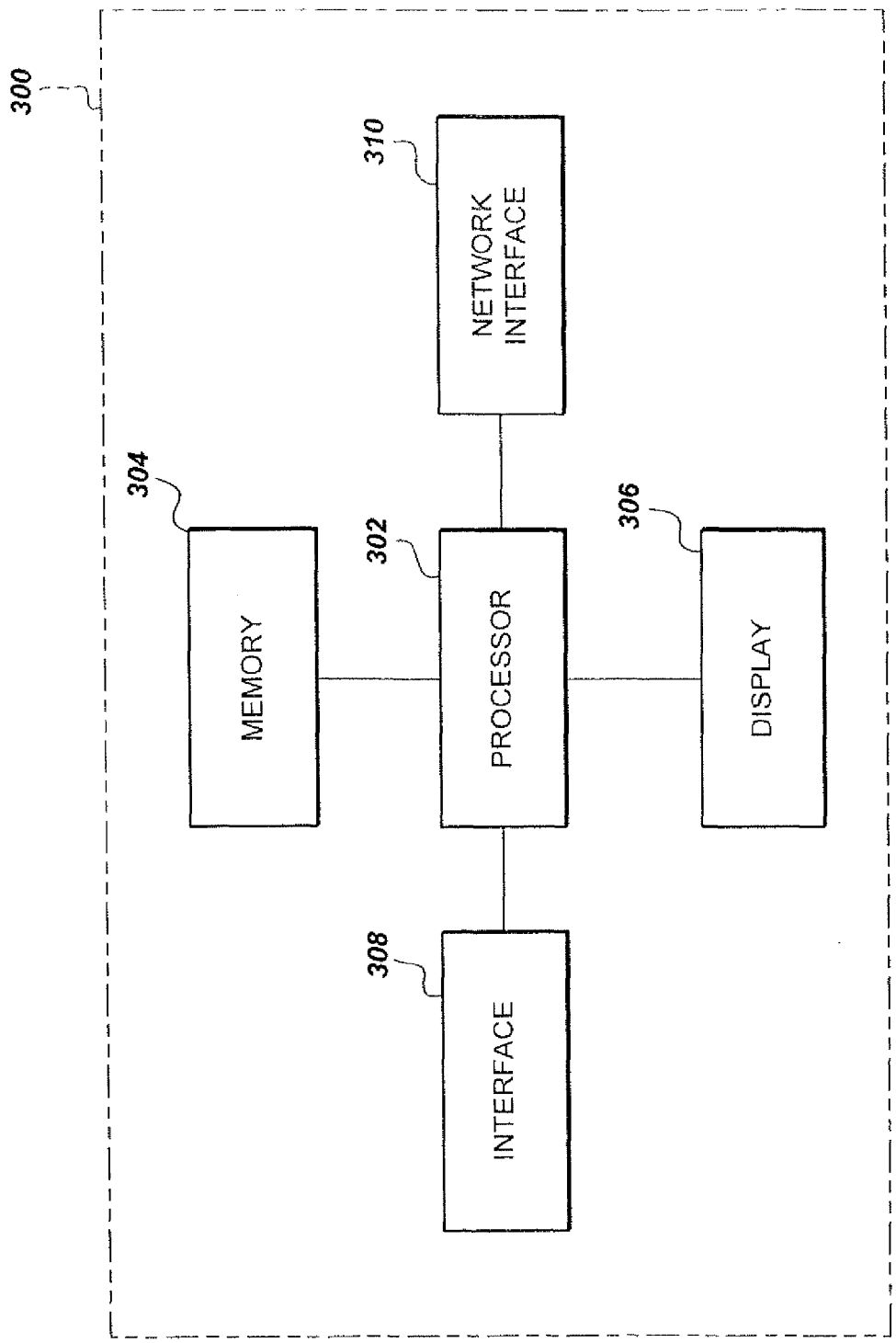
FIG. 13 is a block diagram of a system for implementing a method of generating a graphical resume according to the present invention.

FIG. 13 illustrates a generalized system 300 for implementing the method of generating a graphical resume, although it should be understood that the generalized system 300 may represent a stand-alone computer, computer terminal, portable computing device, networked computer or computer terminal, or networked portable device. Data may be entered into the system 300 by the user via any suitable type of user interface 308, and may be stored in computer readable memory 304, which may be any suitable type of computer readable and programmable memory. Calculations are performed by the processor 302, which may be any suitable type of computer processor, and may be displayed to the user on the display 306, which may be any suitable type of computer display. The system 300 preferably includes a network interface 310, such as a modem or the like, allowing the computer to be networked with either a local area network or a wide area network, such as the Internet.

The processor 302 may be associated with or incorporated into any suitable type of computing device, for example, a personal computer or a programmable logic controller. The display 306, the processor 302, the memory 304, and any associated computer readable media are in communication with one another by any suitable type of data bus, as is well known in the art. Additionally, other standard components, such as a printer or the like, may interface with system 300 via any suitable type of interface.

Examples of computer readable media include a magnetic recording apparatus, an optical disk, a magneto-optical disk, and/or a semiconductor memory (for example, RAM, ROM, etc.). Examples of magnetic recording apparatus that may be used in addition to memory 304, or in place of memory 304, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

In the method of generating a graphical resume, a database is initially established and stored in the computer readable memory 304 associated with the user's computer or with a server in the computer network. A plurality of templates are stored in the database. The templates include an informational template, a textual resume template, and a plurality of graphical resume templates. Each of the textual resume template and the plurality of graphical resume templates includes at least one fillable resume field. The textual resume template has the form of a conventional text resume. The graphical resume templates and the informational template will be discussed in greater detail below with particular reference to the exemplary screenshots of FIGS. 2-12.

Figure 1:
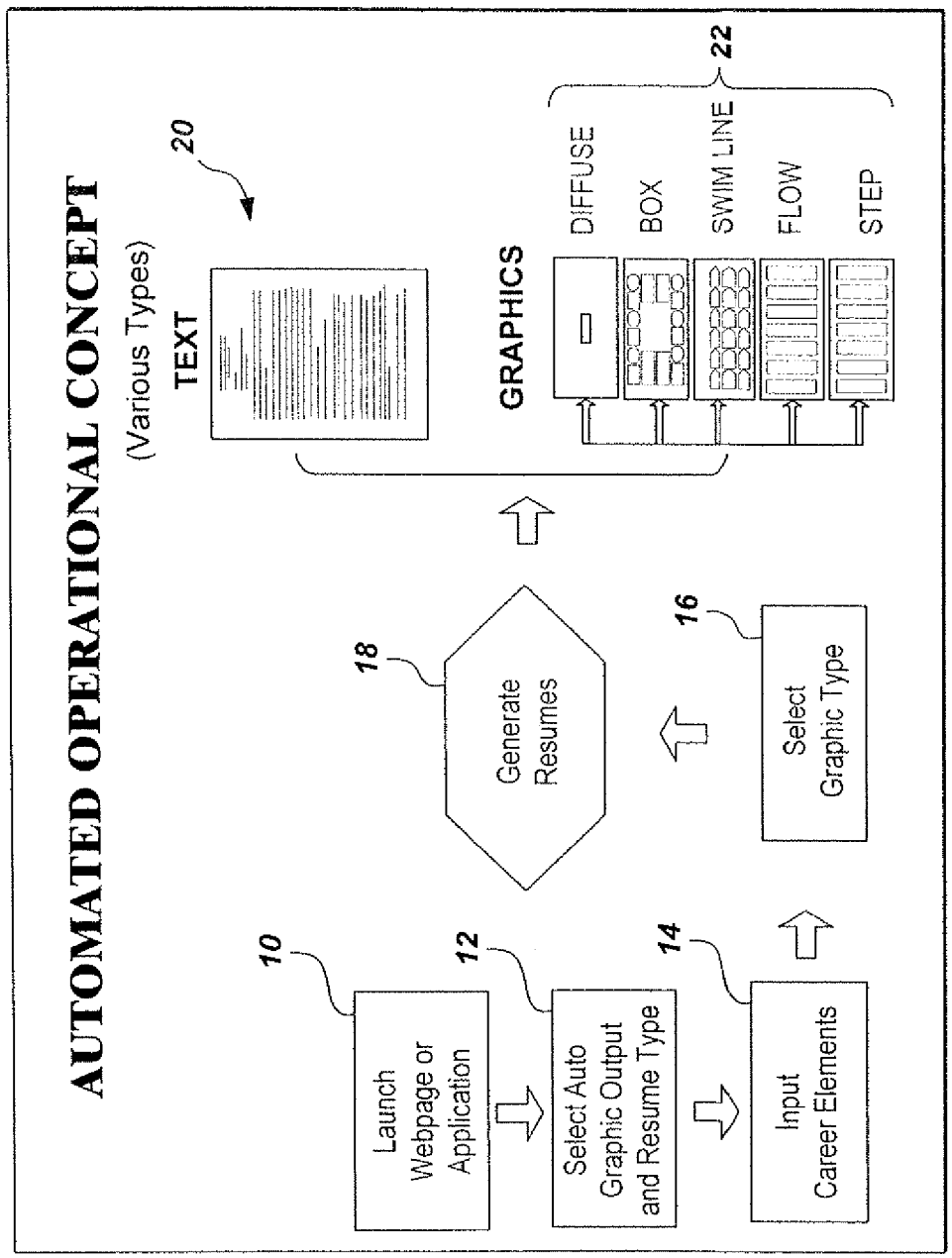
FIG. 1 is a block diagram graphically illustrating process flow in a method of generating a graphical resume according to the present invention.

Upon launch of the software application or web page (step 10 in FIG. 1), the informational template is displayed to the user on display 306. The informational template includes at least one fillable bibliographic field for receiving bibliographic data from the user. The bibliographic data entered by the user via interface 308 (which may be a keyboard, a mouse or any other suitable type of computer interface device) is stored in the database.

FIG. 2 illustrates an exemplary informational template 30 displayed to the user on display 306. The template 30 includes seven separate fillable fields for the user to enter information that is conventionally included in a resume. It should be understood that the particular information and the number of fields is shown for exemplary purposes only in FIG. 2. In the example of FIG. 2, the first field 32 allows the user to enter general information, including name, address, e-mail address, phone number(s), and any security clearances or the like. The second field 34 allows the user to enter or import from a separate electronic document the user's employment objectives. The third field 36 allows the user to enter or import from a separate electronic document the user's particular skills. The fourth field 38 allows the user to enter or import from a separate electronic document the user's educational background, including degree title(s), institution(s) and date(s) of graduation. The fifth field 40 allows the user to enter or import from a separate electronic document the user's technical or occupational certifications, including degree title(s), institution(s) and date(s) of expiration. The sixth field 42 allows the user to enter or import from a separate electronic document the user's occupational or separate educational training background, including course name(s), institution(s) and date(s) of graduation or expiration. The seventh field 44 allows the user to enter or import from a separate electronic document the user's employment background, including job title(s), companies, date(s), and brief descriptions of duties.

A plurality of resume formats are then displayed to the user. The plurality of resume formats correspond to the textual resume template and the plurality of graphical resume templates stored in the database (represented by 20 and 22, respectively, in FIG. 1). Upon user selection of one of the plurality of resume formats (step 12), the at least one fillable resume field of the corresponding one of the textual resume template and the plurality of graphical resume templates stored in the database is filled with the bibliographic data stored in the database to produce a resume (step 14). The user may also choose to additionally customize the graphics and general graphical format of the resume (for the graphical resume selection), as indicated by step 16.

The resume is stored in the database as an electronic document and is displayed to the user (step 18). The electronic document may then be printed or transmitted over the computer network. If the user chooses to produce a textual resume in step 12, then the electronic document produced is a conventional text resume document. If the user chooses to produce a graphical resume in step 12, then the user may choose from a plurality of graphical templates, including a wide variety of customizable graphical features and layouts, stored in the database. It should be understood that the graphical resumes discussed below (with reference to FIGS. 3-12) are described and shown for exemplary purposes only, and that any desired type of graphical format and/or layout may be utilized.

Each graphical resume template includes at least one text portion and at least one graphical portion. Each of the graphical resume templates is divided into a plurality of fields, such as a general informational field, an educational experience field, an employment experience field, a general skill field and a clearance level field. These fields are automatically filled with the information entered by the user into informational template 30.

Figure 3:
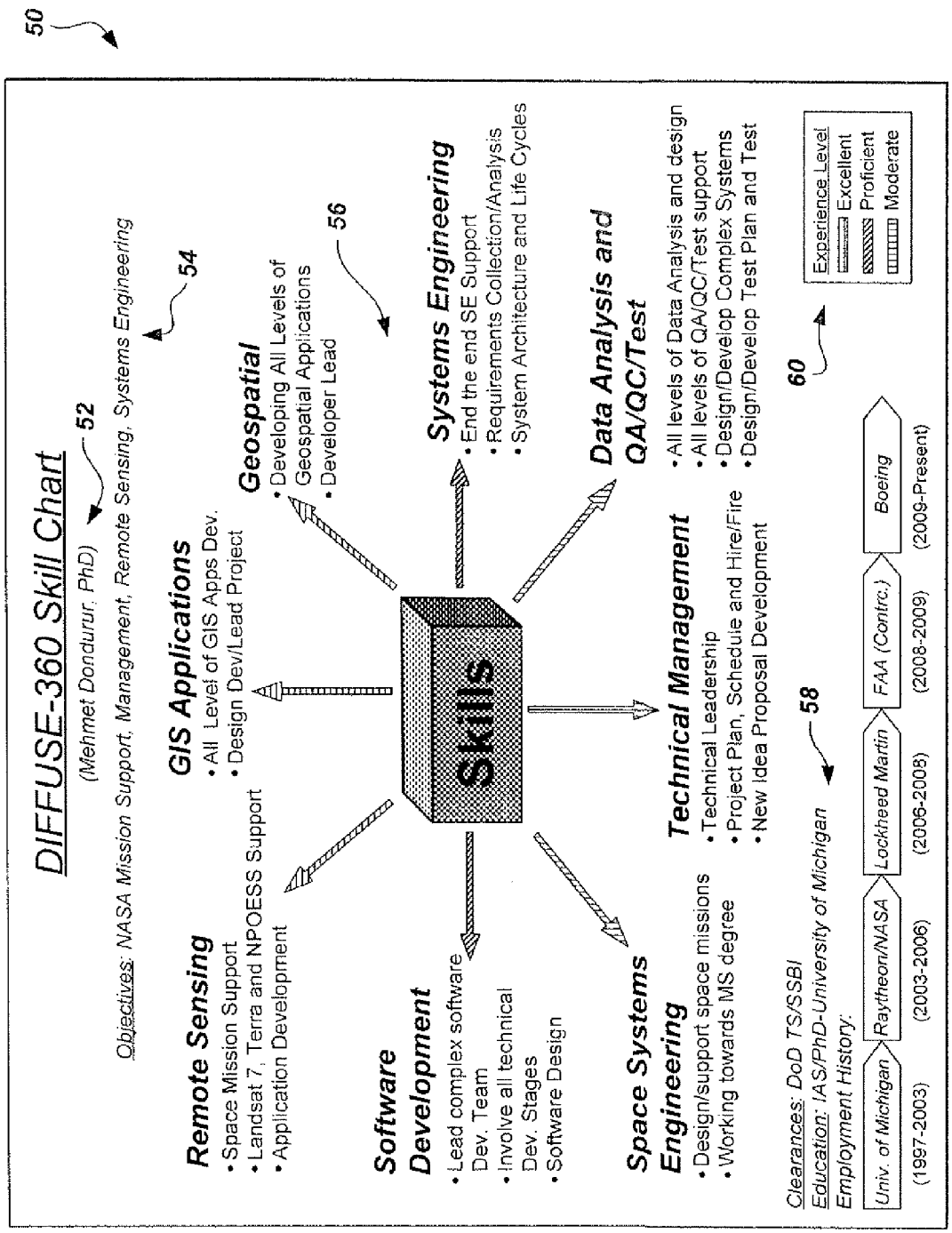
FIG. 3 is an exemplary screenshot of a graphical resume produced by a method of generating a graphical resume according to the present invention.

FIG. 3 illustrates a first example of a graphical resume template, with the graphical format being in a "diffuse" style. This option provides a graphical representation of an outline of the user's skills and includes sub-categories (i.e., core skill information) for each skill. As shown, the graphical resume 30 includes a first field 52 for the user's name, degree and any desired additional contact information (entered into fillable field 32 of informational template 30). The second field 54 includes the user's stated objectives (entered into fillable field 34 of informational template 30). The central and largest field of resume 50 is the skills field 56 (entered into finable field 36 of informational template 36), with a graphical indicator that this field represents the user's skills, and the individual skills arrayed about the center. The user's clearances (if any), educational background (entered into fillable field 38) and employment history (entered into fillable field 44) are displayed in a lower field 58. Additionally, a color code chart 60 may be provided, allowing the user to customize the central field 56 with differing colors, each color representing a different skill level.

Figure 4:
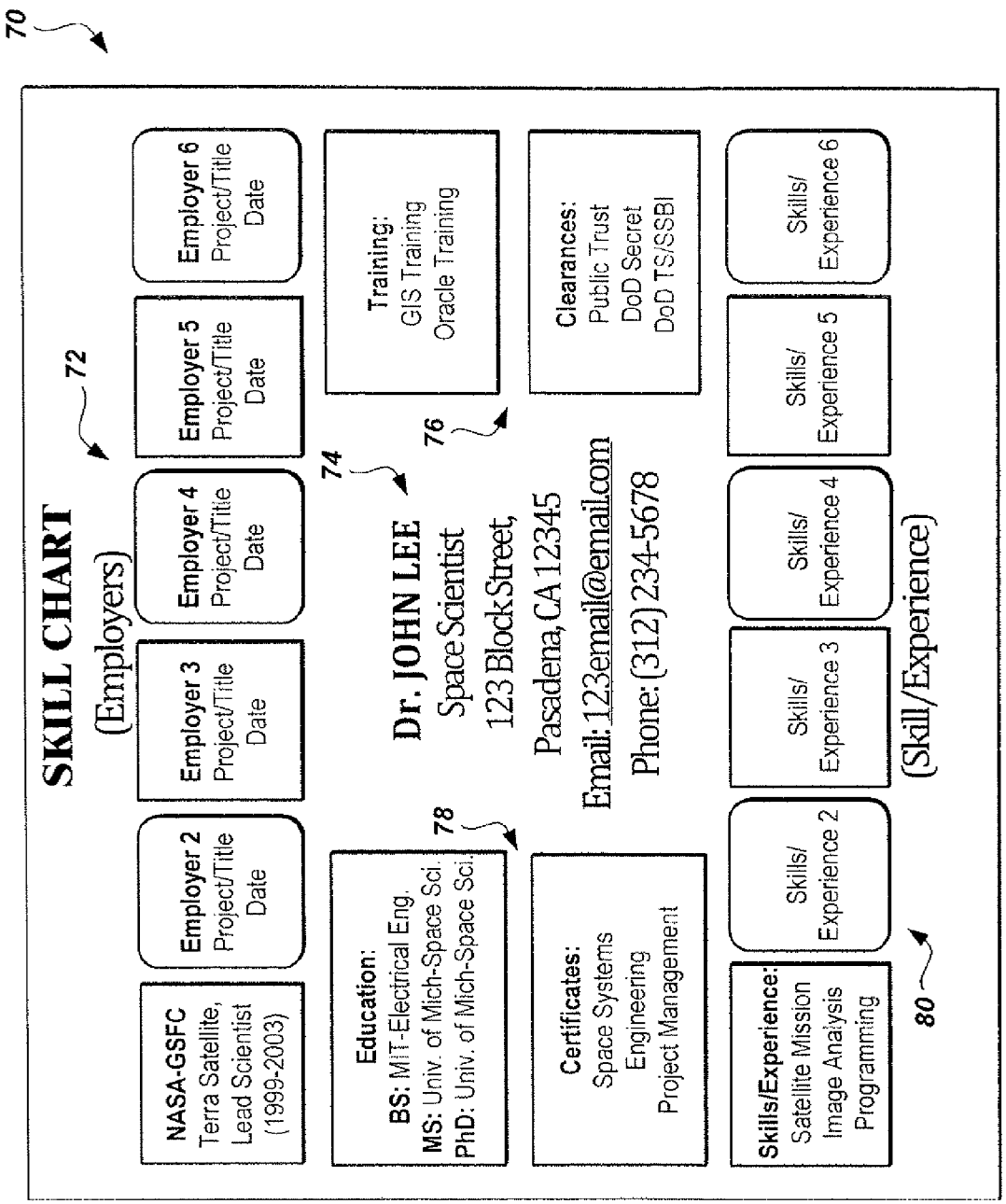
FIG. 4 is an exemplary screenshot of an alternative embodiment of a graphical resume produced by a method of generating a graphical resume according to the present invention.

FIG. 4 illustrates a second example of a graphical resume template, with the graphical format being in a "box" style. This option provides a graphical representation of the user's skills arrayed in a substantially rectangular format about a central region containing the user's bibliographic and contact information. As shown, the graphical resume 70 includes a first field 72 for the user's employment history, with each separate item being displayed in its own box. Individual items of each field may be separated from one another by inclusion in individual boxes, with the shape and color of each box being user customizable. The second field 74, which is the central field, includes the user's name and contact information. The third and fourth fields 76, 78 include additional information, such as training, clearances, education and certificates, each being separated by a distinct box in a user customizable style and color (with all information being entered into the informational template 30 of FIG. 2). The fifth, or lower, field includes further information, such as the user's individual listed skills, with each skill also being displayed in its own box with user-customizable shape and color. The graphical resume 70 may be structured such that the shape and color of the boxes are matched; e.g., the skills utilized in one particular job are placed in a box having the same shape and color as the box containing the particular employer's information.

Figure 5:
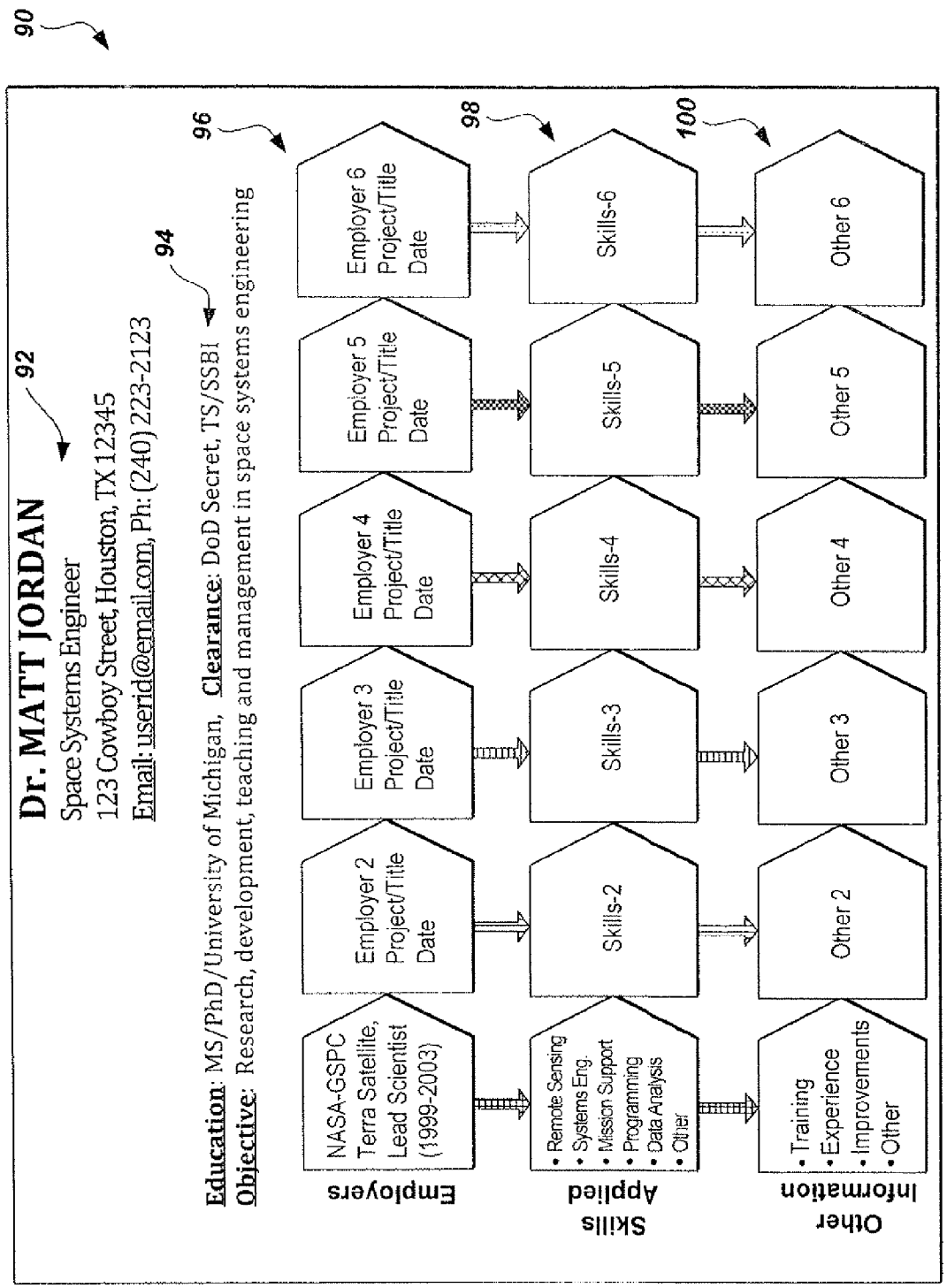
FIG. 5 is an exemplary screenshot of another alternative embodiment of a graphical resume produced by a method of generating a graphical resume according to the present invention.

FIG. 5 illustrates a third example of a graphical resume template, with the graphical format being in a "swim line" style. This option organizes past employers with associated skills and additional information, with related employers, skills and information being shown in vertical columns. As shown, the graphical resume 90 includes a first field 92 for the user's the user's name and contact information. The second field 94 includes desired information, such as clearances, education and certificates, and objectives. The third field 96 includes the user's employment history, with each separate item being displayed in its own box arrayed as a horizontal row. Individual items of each field may be separated from one another by inclusion in individual boxes, with the shape and color of each box being user customizable. The fourth field includes further information, such as the user's individual listed skills, with each skill also being displayed in its own box with user-customizable shape and color. The fourth field 98 is arrayed as a horizontal row, with skills corresponding to a particular employer of field 96 being positioned in the appropriate vertical column. The fifth, or lower, field 100 includes any additional information, such as training, experience, desired or established improvements or any other user-customizable information, with these items being arrayed horizontally, and with each item being included in an individual box positioned in the vertical row appropriate to a particular past employer. The graphical resume 90 may be structured such that the color of the boxes are matched; e.g., the skills utilized in one particular job are placed in a box having the same color as the box containing the particular employer's information, with skills able to be displayed as linked to multiple employers via color matching.

Figure 6:
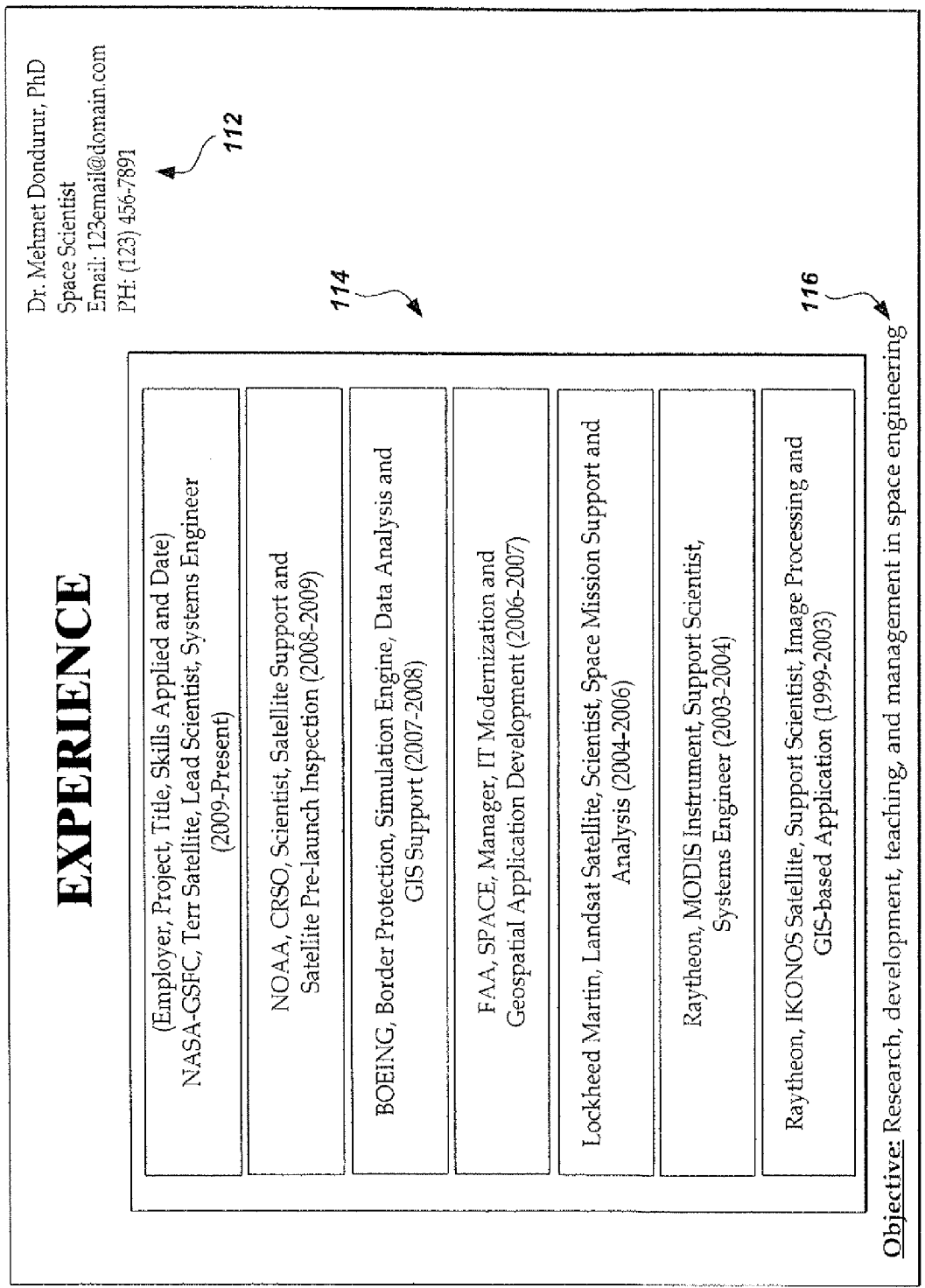
FIG. 6 is an exemplary screenshot of another alternative embodiment of a graphical resume produced by a method of generating a graphical resume according to the present invention.

FIG. 6 illustrates a fourth example, which primarily lists employment history. Such a resume may be referred to as an "Experience" style resume. Resume 110 displays the user's employment history and experience prominently in a primary field 114, with the user's contact information 112 being positioned outside of the primary field (in this particular example, in the upper, right-hand corner, and printed in a smaller font). Additional information, such as the user's objectives, may also be included in a separate field 116, also external to the primary field.

Figure 7:
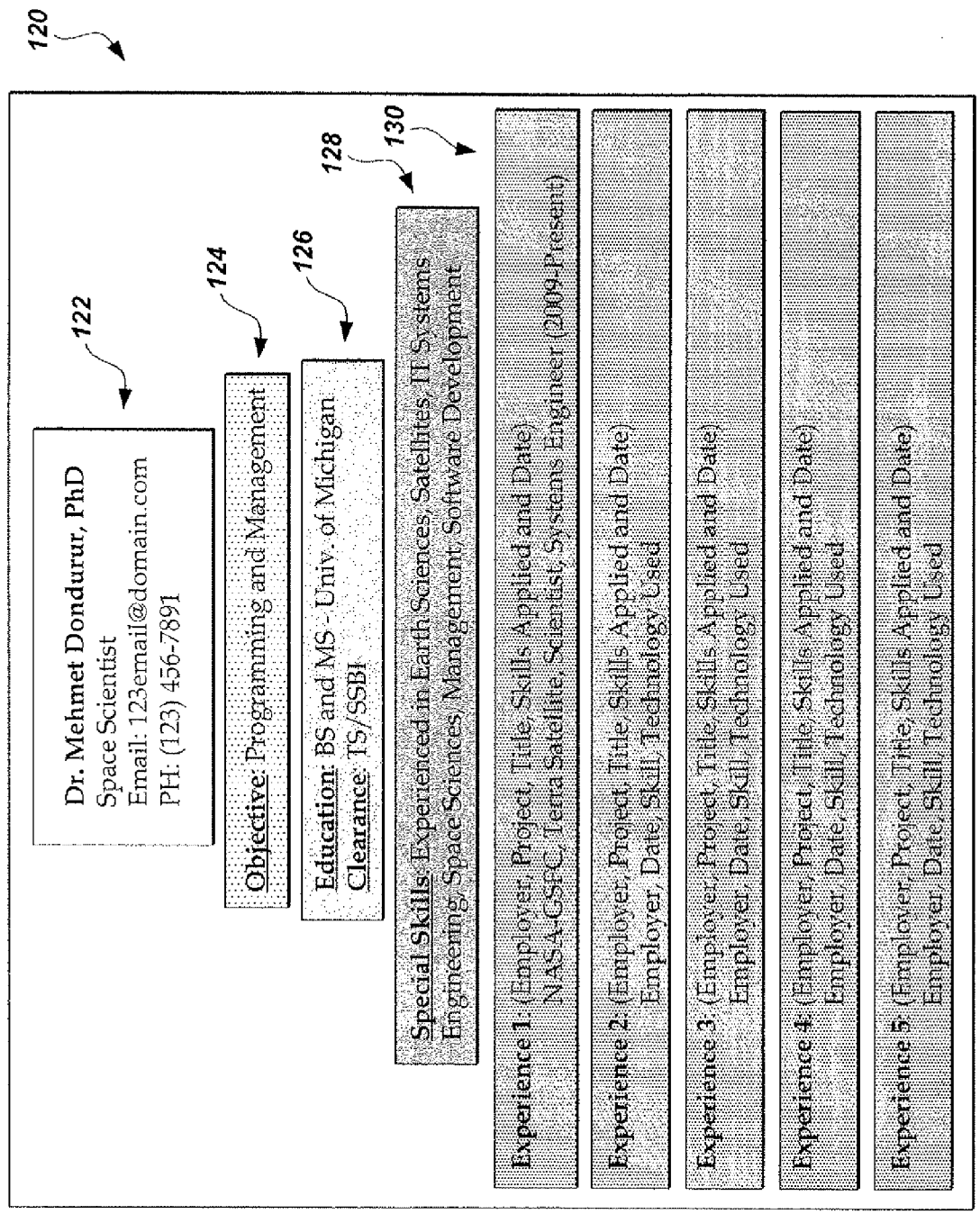
FIG. 7 is an exemplary screenshot of still another alternative embodiment of a graphical resume produced by a method of generating a graphical resume according to the present invention.

FIG. 7 illustrates a fifth example, which presents the user's relevant information in a vertical, logical "flow". Resume 120 includes the user's name and contact information in the first, or top-most, field 122. Beneath the first field, the user's objectives may be displayed in a second field 124. A third field 126 may include the user's educational background and clearances. Beneath this is a fourth field 128, which may be directed towards displaying the user's particular skills. The fifth, or lowermost, field 130 includes the user's employment history, with each previous employer being displayed in a separate box. The employment history may also include sub-history elements and descriptions, such as name of employer, project, title, dates and core skills applied, etc.

Figure 8:
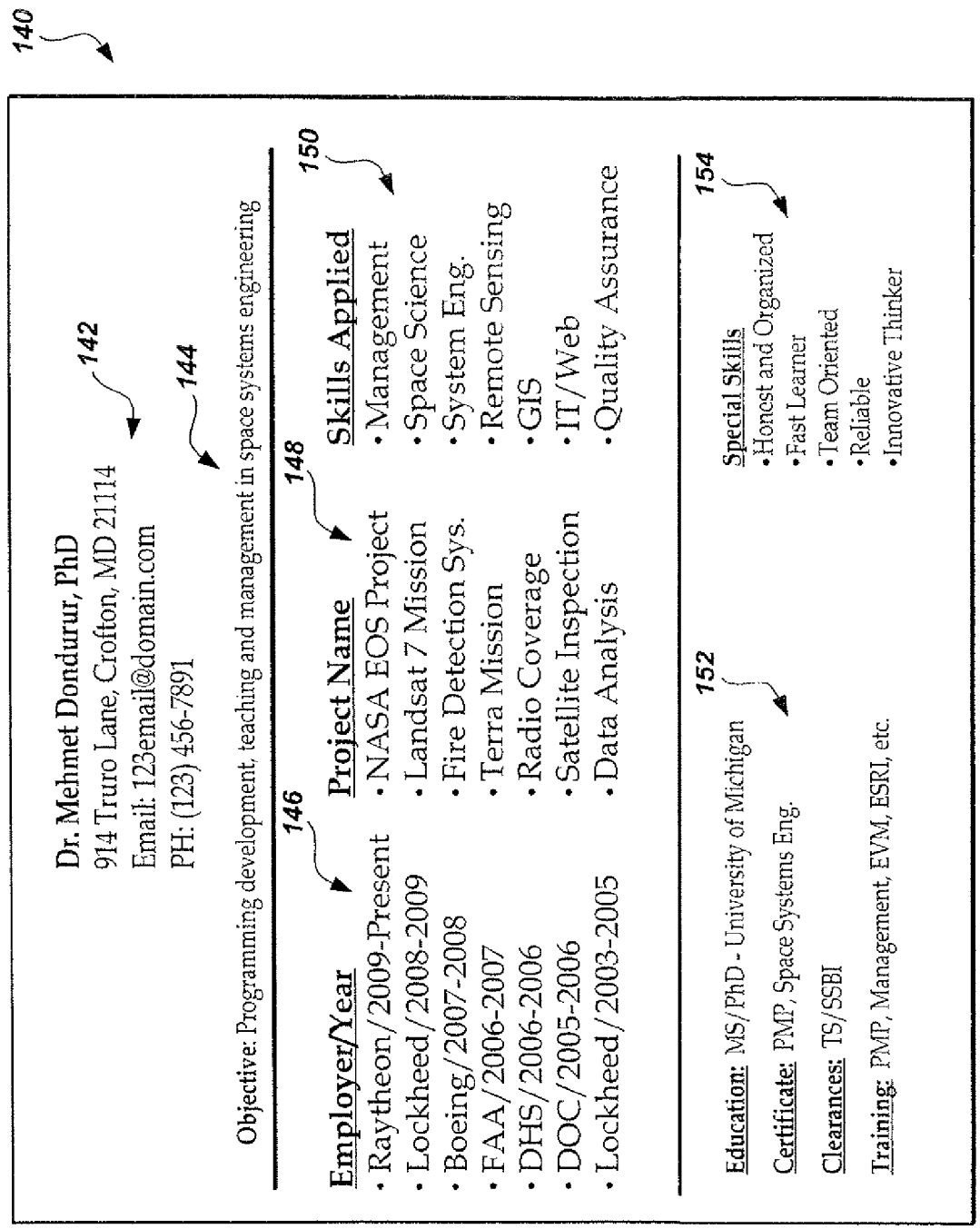
FIG. 8 is an exemplary screenshot of another alternative embodiment of a graphical resume produced by a method of generating a graphical resume according to the present invention.

FIG. 8 illustrates a sixth example in which the user's key core career information is briefly summarized and organized, allowing a potential employer to quickly assess the user's skills and background. Such a resume may be referred to as a "Summary" style resume. Resume 140 includes the user's name and contact information in the first, or top-most, field 142. Beneath the first field, the user's objectives may be displayed in a second field 144. A central portion includes third, fourth and fifth fields 146, 148, 150, provided as vertical, bulleted listings of past employment, project names and applied skills. Associated employers, projects and skills used may be horizontally aligned. A sixth field 152 may include the user's educational background and clearances, along with additional information, such as certificates and training. A seventh field 154 may include additional skill listings. In this example, the prospective employer may click in a particular field, allowing hyperlinks embedded therein to access a further detailed listing of information and/or access a corresponding conventional textual resume. Such hyperlinks may be embedded in any of the resume examples described herein.

Figure 9:
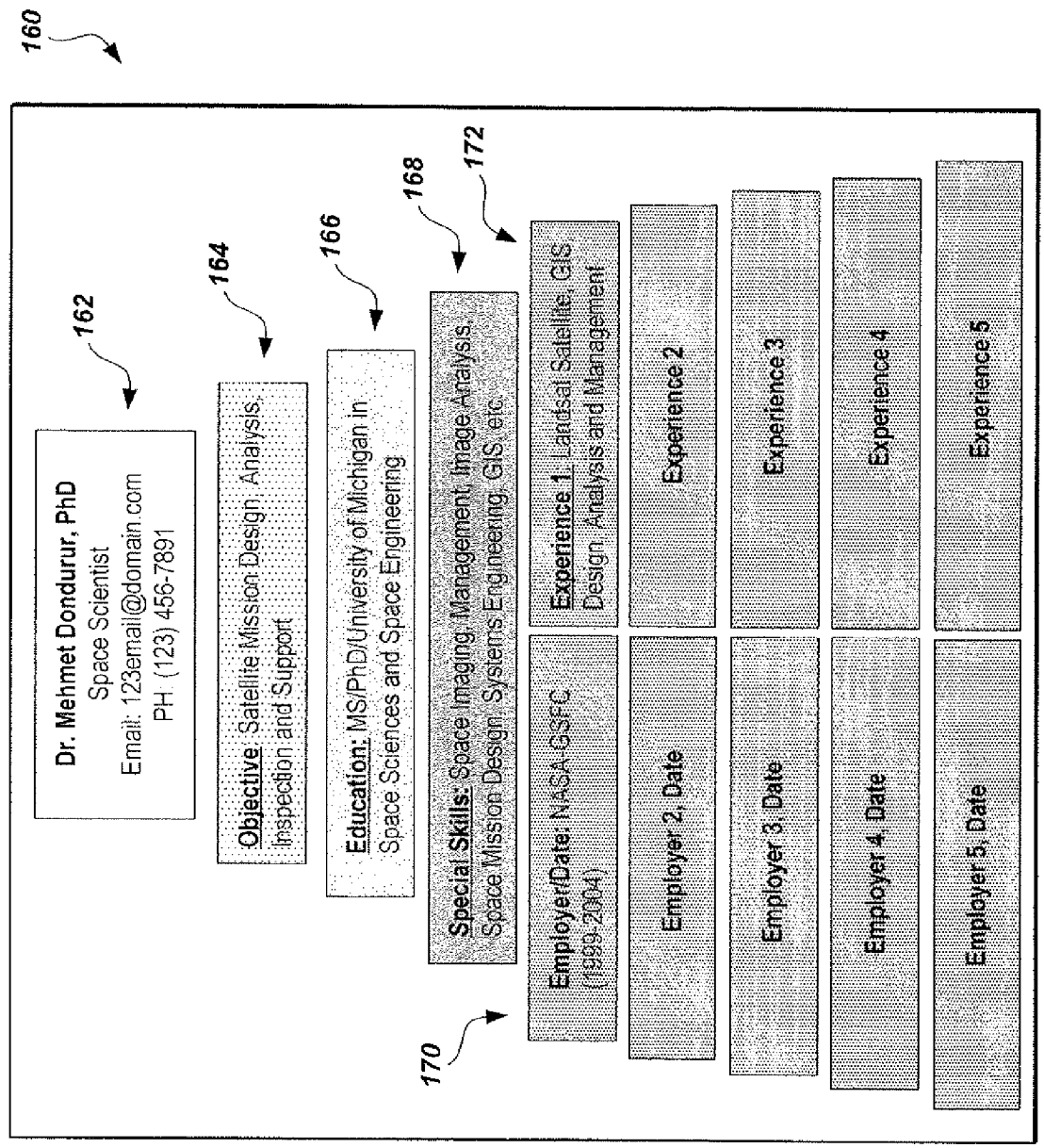
FIG. 9 is an exemplary screenshot of another alternative embodiment of a graphical resume produced by a method of generating a graphical resume according to the present invention.

FIG. 9 illustrates a seventh example, which presents the user's relevant information in a manner similar to the "flow" presentation of FIG. 7, but with a "pyramid" type design. Resume 160 includes the user's name and contact information in the first, or top-most, field 162. Beneath the first field, the user's objectives may be displayed in a second field 164. A third field 166 may include the user's educational background and clearances. Beneath this is a fourth field 168, which may be directed towards displaying the user's particular skills. As opposed to the linear arrangement of FIG. 7, resume 160 includes fifth and sixth fields 170, 172, with field 170 including the user's employment history, with each previous employer being displayed in a separate box. Field 172 is aligned with field 170 and includes sub-history elements and descriptions, such as name of employer, project, title, dates and core skills applied, etc. related to each particular employer of field 170.

Figure 10:
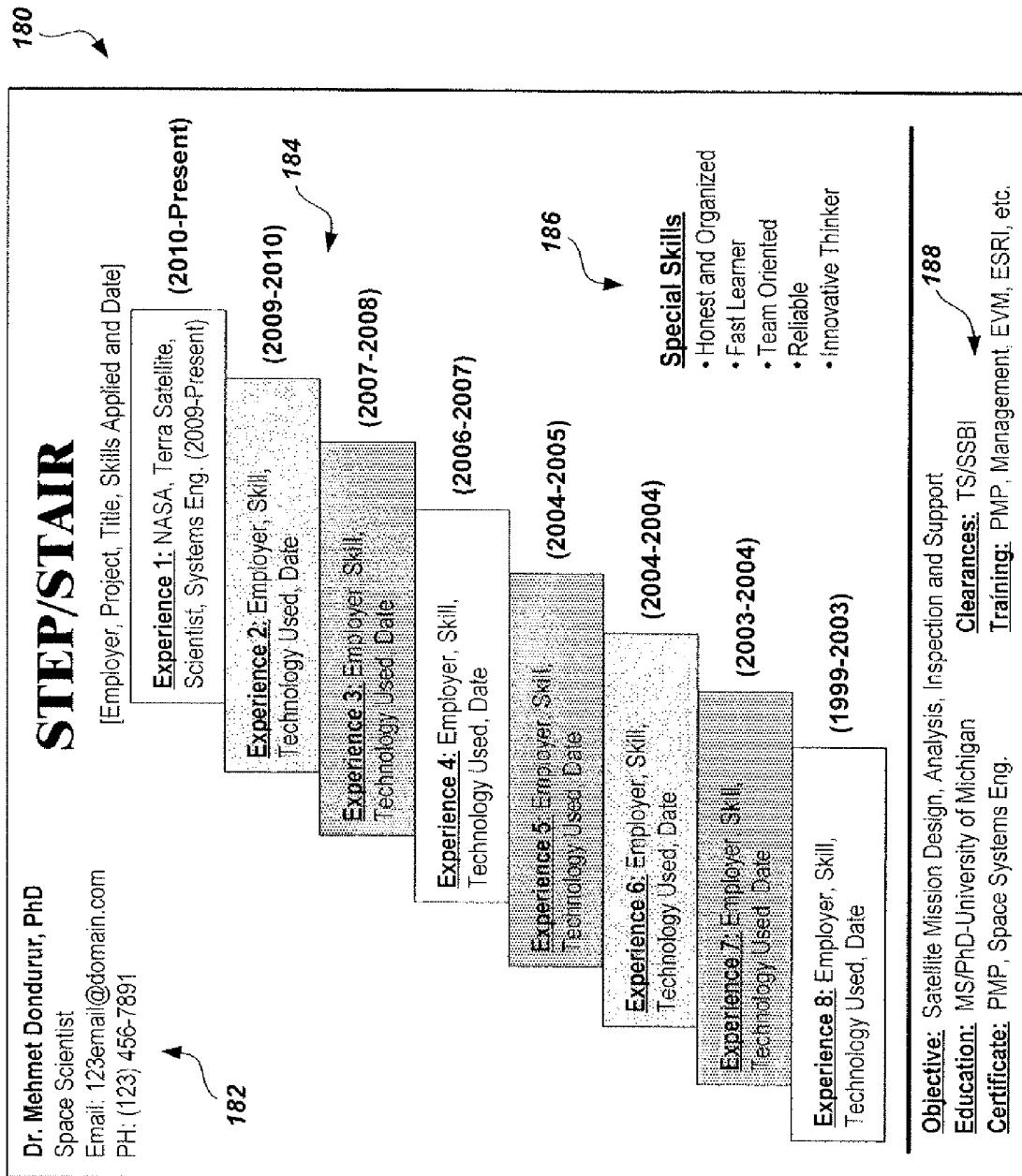
FIG. 10 is an exemplary screenshot of still another alternative embodiment of a graphical resume produced by a method of generating a graphical resume according to the present invention.

FIG. 10 illustrates an eighth example which lists, primarily, employment history in a step-type fashion, with each employer being listed in a separate box, with the boxes being arrayed as steps, ranged chronologically such that the most recent employer appears at the top. Such a resume may be referred to as a "Step/Stair" style resume. Resume 180 displays the user's employment history and experience prominently in a primary field 184, with the user's contact information 182 being positioned outside of the primary field (in this particular example, in the upper, left-hand corner, and printed in a smaller font). Additional information, such as the user's objectives, education, certificates, clearances and training may also be included in a separate field 188, also external to the primary field. Additional information, such as special skills, may also be listed outside of the primary field, such as in field 186 (in this particular example, in the lower right of the display).

Figure 11:
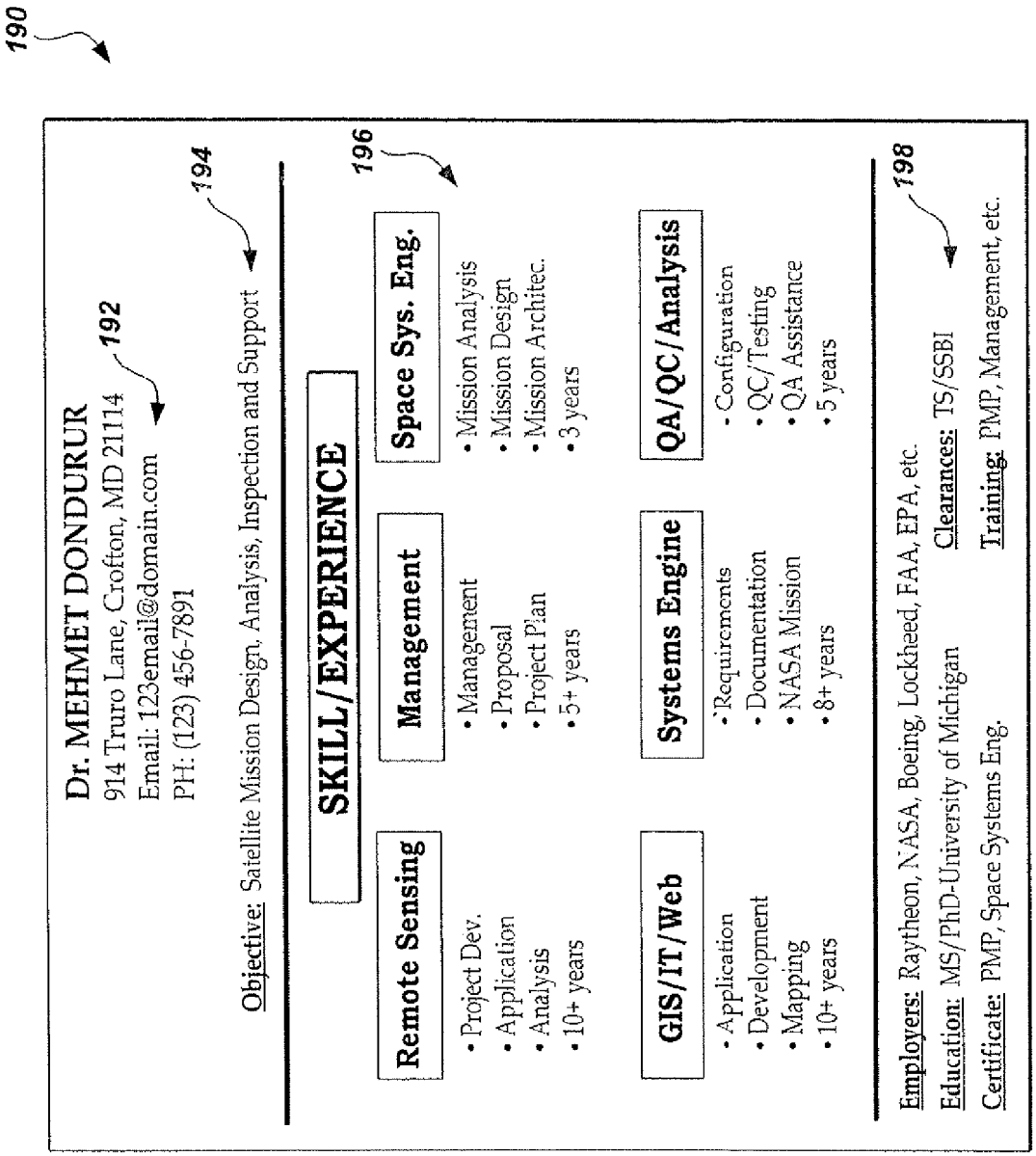
FIG. 11 is an exemplary screenshot of another alternative embodiment of a graphical resume produced by a method of generating a graphical resume according to the present invention.

FIG. 11 illustrates a ninth example in which the user's core skills and experience information is briefly summarized and organized, allowing a potential employer to quickly assess the user's skills and background. Such a resume may be referred to as a "Bullet" style resume. Resume 190 includes the user's name and contact information in the first, or top-most, field 192. Beneath the first field, the user's objectives may be displayed in a second field 194. A central portion includes the user's skills, broken into general categories (such as, for example, "Remote Sensing", "Management", "Space Systems Engineering", etc.), with sub-listings associated with each general skill. A fourth field 198 may include the user's educational background and clearances, along with additional information, such as certificates and training. In this example, the prospective employer may click in a particular field, allowing hyperlinks embedded therein to access a further detailed listing of information and/or access a corresponding conventional textual resume, as described above.

Figure 12:
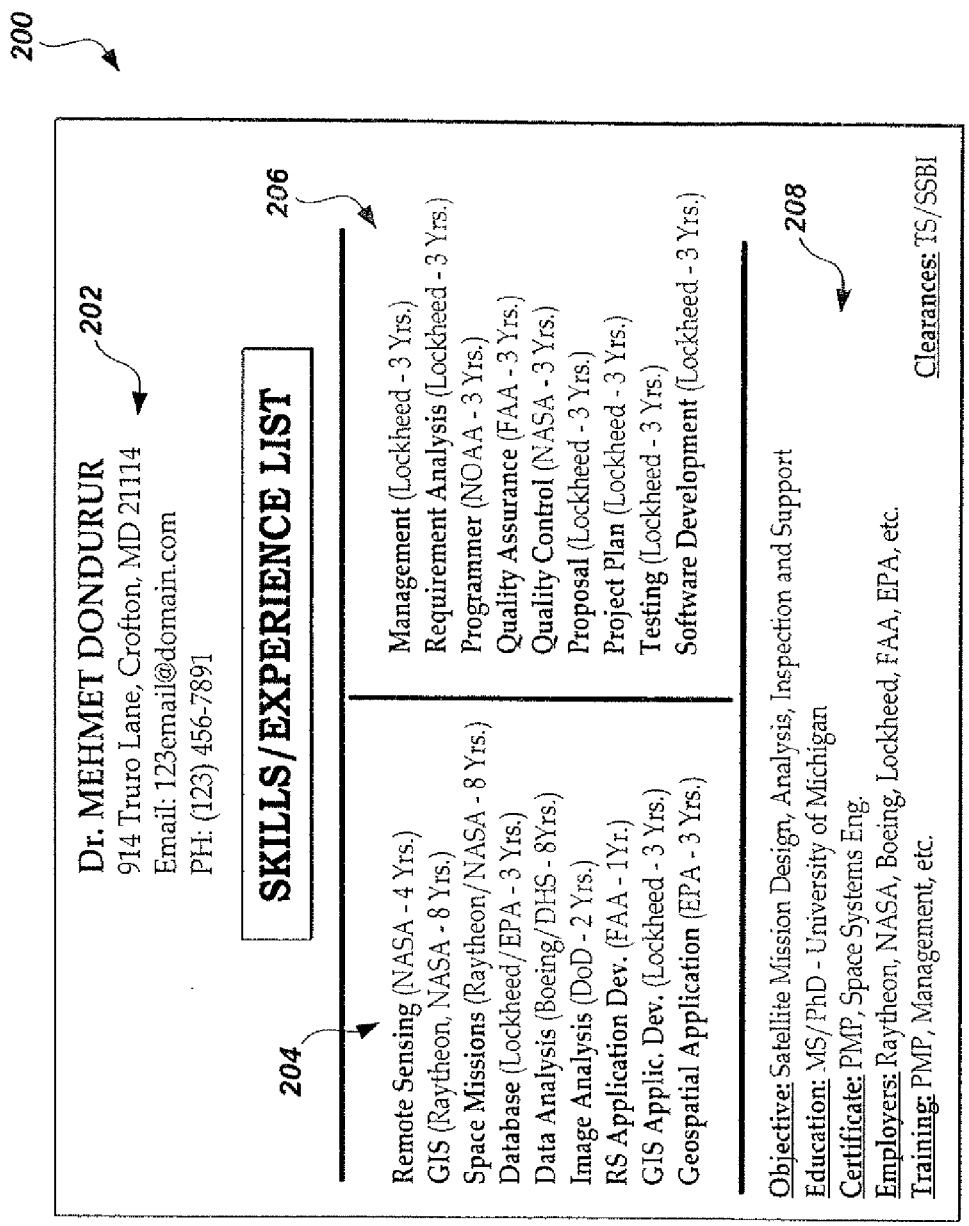
FIG. 12 is an exemplary screenshot of yet another alternative embodiment of a graphical resume produced by a method of generating a graphical resume according to the present invention.

FIG. 12 illustrates a tenth example in which the user's core skills and employment information is briefly summarized and organized, allowing a potential employer to quickly assess the user's skills and background. In this example, the prospective employer may click in a particular field, allowing hyperlinks embedded therein to access a further detailed listing of information and/or access a corresponding conventional textual resume, as described above. Such a resume may be referred to as a "List" style resume. Resume 200 includes the user's name and contact information in the first, or top-most, field 202. A central portion includes the user's skills combined with names and dates of employers. In this example, the user has sufficient skills to provide a pair of vertical columns 204, 206, though it should be understood that the number and size of the central field is determined by the quantity of information entered by the user into the informational template. A fourth, or lower-most, field 208 may include the user's objectives, educational background and clearances, along with additional information, such as certificates and training.

It should be understood that that the resumes shown in FIGS. 3-12 are shown for exemplary purposes only, and that any desired graphical resume templates may be stored in the database, including any desired formatting, arrangement of fields and graphical elements. Additionally, the graphical features described above with regard to one example may be applied to any of the additional examples. Further, it should be understood that the graphical resume templates are user-customizable, allowing the positioning of fields, fonts, graphical elements, relative sizes and shapes, quantities of displayed information and the nature of displayed information to be customized by the user for each template. In a further alternative embodiment, the user may select a manual mode of operation. Rather than filling the textual templates and having the selected graphical style of resume automatically filled with the information, the user may first choose a blank or empty graphical resume and then manually enter the user's data directly into the selected graphical form. Preferably, this graphical template will include a text guide for each of the career and personal elements, including font, size, color and style. The user will be given cues of which information to insert in particular portions of the graphical template. Once the user completes entry of the career and personal data into the graphical template, the system will allow the graphical resume to be saved and/or printed. In this mode, a separate text-only resume is preferably not also generated.

It is to be understood that the present invention is not limited to the embodiments described above, but encompasses any and all embodiments within the scope of the following claims.

We claim:

1. A method of generating a graphical resume, comprising the steps of:
    establishing a database stored in computer readable memory;
    storing an informational template, a textual resume template and a plurality of graphical resume templates in the database, the textual resume template and the plurality of graphical resume templates each including at least one fillable resume field, the plurality of graphical resume templates each including customizable, graphical non-textual visual elements, wherein the customizable, graphical non-textual visual elements visually indicate a coded, organizational reference scheme for data entered into the at least one fillable resume field;
    displaying the informational template to a user, the informational template including at least one fillable bibliographic field for receiving bibliographic data from the user;
    storing the bibliographic data in the database;
    displaying a plurality of resume formats to the user, the plurality of resume formats corresponding to the textual resume template and the plurality of graphical resume templates stored in the database;
    upon user selection of one of the plurality of resume formats, a computer processor automatically filling the at least one fillable resume field of the corresponding one of the textual resume template and the plurality of graphical resume templates stored in the database with the bibliographic data stored in the database to produce a resume;
    storing the resume as an electronic document in the database; and
    displaying the resume to the user.

2. The method of generating a graphical resume as recited in claim 1, further comprising the step of printing the resume.

3. The method of generating a graphical resume as recited in claim 1, further comprising the step of generating the plurality of graphical resume templates, wherein each of the graphical resume templates includes at least one text portion and at least one graphical portion.

4. The method of generating a graphical resume as recited in claim 3, wherein the step of generating the plurality of graphical resume templates includes dividing each of the graphical resume templates into a plurality of fields.

5. The method of generating a graphical resume as recited in claim 4, wherein the step of dividing each of the graphical resume templates into a plurality of fields includes dividing each of the graphical resume templates into a general informational field, an educational experience field, and an employment experience field.

6. The method of generating a graphical resume as recited in claim 5, wherein the step of dividing each of the graphical resume templates into a plurality of fields further includes dividing each of the graphical resume templates into a general skill field and a clearance level field.

7. The method of generating a graphical resume as recited in claim 1, further comprising the step of transmitting the electronic document over a computer network.

8. A system for generating a graphical resume, comprising:
a processor;
computer readable memory coupled to the processor;
a user interface coupled to the processor;
a display; and
software stored in the memory and executable by the processor, the software having:
means for establishing a database stored in the computer readable memory;
means for storing an informational template, a textual resume template and a plurality of graphical resume templates in the database, wherein each of the textual resume template and the plurality of graphical resume templates includes at least one fillable resume field, wherein the informational template is displayed to the user on the display, the informational template including at least one fillable bibliographic field for receiving bibliographic data from the user, the plurality of graphical resume templates each including customizable, graphical non-textual visual elements, wherein the customizable, graphical non-textual visual elements visually indicate a coded, organizational reference scheme for data entered into the at least one fillable resume field;
means for storing the bibliographic data in the database;
means for displaying a plurality of resume formats to the user on the display, the plurality of resume formats corresponding to the textual resume template and the plurality of graphical resume templates stored in the database;
means for filling the at least one fillable resume field of the corresponding one of the textual resume template and the plurality of graphical resume templates stored in the database with the bibliographic data stored in the database to produce a resume, upon user selection of one of the plurality of resume formats;
means for storing the resume as an electronic document in the database; and
means for displaying the resume to the user on the display.

9. The system for generating a graphical resume as recited in claim 8, further comprising means for printing the resume.

10. The system for generating a graphical resume as recited in claim 8, further comprising a network interface.

11. The system for generating a graphical resume as recited in claim 10, further comprising means for transmitting the electronic document over a computer network.

12. The system for generating a graphical resume as recited in claim 8, wherein each of the graphical resume templates includes at least one text portion and at least one graphical portion.

13. The system for generating a graphical resume as recited in claim 12, wherein each of the graphical resume templates is divided into a plurality of fields including a general informational field, an educational experience field, and an employment experience field.

14. The system for generating a graphical resume as recited in claim 13, wherein each of the graphical resume templates is further divided into a general skill field and a clearance level field.

15. A computer software product that includes a non-transitory medium readable by a processor, the non-transitory medium having stored thereon a set of instructions for generating a graphical resume, the instructions comprising:
(a) a first sequence of instructions which, when executed by the processor, causes the processor to establish a database stored in the medium;
(b) a second sequence of instructions which, when executed by the processor, causes the processor to store an informational template, a textual resume template and a plurality of graphical resume templates in the database, wherein each of the textual resume template and the plurality of graphical resume templates includes at least one fillable resume field, the plurality of graphical resume templates each including customizable, graphical non-textual visual elements, wherein the customizable, graphical non-textual visual elements visually indicate a coded, organizational reference scheme for data entered into the at least one fillable resume field;
(c) a third sequence of instructions which, when executed by the processor, causes the processor to display the informational template to a user, the informational template including at least one finable bibliographic field for receiving bibliographic data from the user;
(d) a fourth sequence of instructions which, when executed by the processor, causes the processor to store the bibliographic data in the database;
(e) a fifth sequence of instructions which, when executed by the processor, causes the processor to display a plurality of resume formats to the user, the plurality of resume formats corresponding to the textual resume template and the plurality of graphical resume templates stored in the database;
(f) a sixth sequence of instructions which, when executed by the processor, causes the processor to, upon user selection of one of the plurality of resume formats, fill the at least one fillable resume field of the corresponding one of the textual resume template and the plurality of graphical resume templates stored in the database with the bibliographic data stored in the database to produce a resume;
(g) a seventh sequence of instructions which, when executed by the processor, causes the processor to store the resume as an electronic document in the database; and
(h) an eighth sequence of instructions which, when executed by the processor, causes the processor to display the resume to the user.

16. The computer software product as recited in claim 15, wherein the instructions further comprise a ninth sequence of instructions which, when executed by the processor, causes the processor to print the resume.

17. The computer software product as recited in claim 15, wherein the instructions further comprise a tenth sequence of instructions which, when executed by the processor, causes the processor to transmit the electronic document over a computer network.

* * * * *